United States Patent Office 3,223,680
Patented Dec. 14, 1965

3,223,680
POLYESTERS OF OLEFINIC ALCOHOLS AND COMPLEX ACIDS AND THEIR POLYMERIZED PRODUCTS
Walter E. Kramer, Niles, Ill., assignor, by mesne assignments, to Union Oil Company of California, Los Angeles, Calif., a corporation of California
No Drawing. Filed Dec. 30, 1960, Ser. No. 79,505
2 Claims. (Cl. 260—75)

This invention relates to novel thermosetting resins prepared from polycarboxylic acids derived from solvent extracts obtained in the solvent extraction of mineral lubricating oils by reaction with monohydric and dihydric olefinic alcohols under esterification conditions and polymerizing the resulting complex unsaturated polyesters at their double bonds.

Polyester resins derived from unsaturated dicarboxylic acids and saturated monohydric or dihydric alcohols are known in the prior art. The resins of this invention differ therefrom in that they are derived by polymerization from unsaturated polyesters prepared from unsaturated monohydric or dihydric alcohols and complex polynuclear aromatic di- and polycarboxylic acids. The nature of the complex acids from which the resins of this invention are prepared also differentiates the final resin product from the resins of the prior art.

It becomes, therefore, a primary object of this invention to provide a new class of thermosetting resins derived from unsaturated di- and polyesters prepared by esterifying the complex mixed di- and polycarboxylic acids having nuclei predominating in polynuclear aromatic alkylaryl configurations with known mono- or dihydric unsaturated alcohols and polymerizing the resulting unsaturated esters.

Another object of this invention is to provide a new class of thermosetting resins derived from solvent extracts obtained in the manufacture of mineral lubricating oils.

An object of this invention is to provide a new class of thermosetting resins from unsaturated esters and polyesters.

Another object of this invention is to provide polymers of monomeric diesters having the formula, I 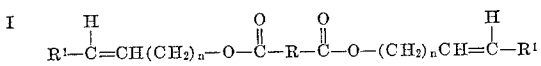

wherein R is the complex residue or nuclei or di- and poly carboxylic acids prepared from complex aromatic, polynuclear compounds, R' is hydrogen, or an alkyl, aryl, alkaryl, aralkyl, cycloparaffinic, or hydroxy-substituted alkyl, aryl, alkaryl, cycloparaffinic, or aralkyl radical, and n is one or greater.

Another object of this invention is to provide polymers of dimeric and higher polyesters represented by the formulas, II 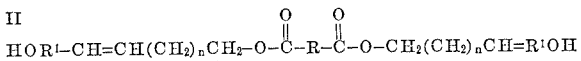

III 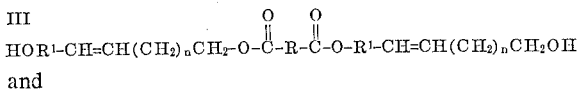

and

IV 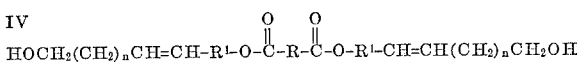

The —CH=CH— portion of the molecule may be —C≡C—.

An object of this invention is to provide polymerized polyester resins predominating in two or more combined or polymerized esters of the Formulae I, II, III, and IV.

An object of this invention is to provide a method of preparing polyesters of Formulae I, II, III, and IV.

These and further objects of the invention will become apparent or be described as the specification proceeds.

The esters used as intermediates in preparing the resins of this invention are prepared with facility by known esterification methods and conditions. It is only necessary to place the complex acids and the selected olefinic alcohol in a reaction vessel and heat same at least to the melting point of the reactants, and/or to a temperature sufficient to drive off the water of esterification from the reaction mass. Any solvent which is inert with either reactants or the products may be used as the solvent to remove water as the reaction proceeds. The use of a catalyst is optional.

When employing monohydric alcohols to prepare the ester intermediates from which the resins of this invention are prepared, an alcohol/acid molar ratio of about 2/1 is used and a monomeric unsaturated diester results. The molecular weight and properties of the resulting polyester intermediate, and consequently those of the resin, can be controlled when using dihydric alcohols in a number of ways. First, an alcohol/acid molar ratio greater than 1/1 leads to intermediate polyesters of relatively low molecular weight, with the molecular weight of the polyesters being inversely proportional to the alcohol/acid mole ratio.

A second feature of this invention is the finding that higher esterification temperatures result in intermediate polyesters having relatively low molecular weights, while low temperatures result in polyesters having high molecular weights. The molecular weight of the polyester is proportional to the degree of esterification. A third feature is the discovery that the choice and concentration of catalyst affect the molecular weight. These and other features will be explained as the description of the invention proceeds.

The complex, polynuclear, aromatic, and alkaromatic di- and polycarboxylic acids, used to prepare the novel thermosetting resins of this invention, are derived by metalation, carbonation and acidification of a source of complex, polynuclear, aromatic nuclei. These complex acids may be prepared by the prior art methods of metalation and carbonation or the process of copending applications Serial Numbers 819,932, now U.S. Patent No. 3,128,302, issued April 7, 1964, and 79,661, now U.S. Patent No. 3,153,087, issued October 13, 1964. Since the preferred source material, namely, solvent extracts from the manufacture of mineral lubricating oils, does not lend itself to economical production of the desired complex acids using the prior art methods, the preferred methods of preparation set forth in said copending applications will be described and the properties of the acids set forth as examples. The details of these processes as described in said copending applications are incorporated herein by reference.

One procedure is to react about 30 parts of a petroleum fraction rich in complex polynuclear aromatics, as exemplified by solvents extracts, with 1 to 5 parts of an alkali metal, such as sodium, potassium, cesium, lithium, and rubidium, and their mixtures and amalgams, at a temperature of about −60° to 80° C. in the presence of a reaction solvent such as dimethyl glycol ether, dimethyl ether, methylakyl ethers, dialkyl glycol ethers, tetrahydrofuran, methylal, and trimethylamine. The formation of the adduct is promoted by shearing, agitation, providing an excess of alkali metal, using a pre-formed dispersion of the alkali metal in an inert solvent, or using a pre-formed dispersion of the alkali metal in a portion or all of the solvent extract. These techniques overcome the induction period of the reaction due to impurities, including sulfur compounds present therein, which tend to coat the alkali metal particles and prevent the reaction or prolong the induction period. A brookfield counterrotating stirrer is used to give continuous shearing and expose fresh metal surfaces during the reaction. Color changes indicate the progress of the reaction.

The alkali-metal adduct thus formed is either separated or left in the unreacted oil, and the mixture is treated with excess gaseous or solid carbon dioxide at temperatures ranging from about −20° C. to −80° C., causing a discharge of the color. This forms the alkali-metal salt of the complex acid which, upon acidification with a mineral acid, yields the desired complex, polynuclear polycarboxylic acids in good yields. To illustrate, the following non-limiting examples are given.

EXAMPLE I 100 gms. of extract oil No. 19 (Table I) from the preparation of 170 vis., 100 V.I. neutral oil, dissolved in 675 cc. of dry tetrahydrofuran was reacted with agitation at 10° to 30° C. with 8.3 gms. of metallic sodium in the form of 3/16" cubes. After 25 minutes, adduct-formation began and a strong color change took place. The product was cooled to −60° C. while an excess of carbon dioxide gas was introduced, resulting in a discharge of the color without precipitation. The 5.1 gms. of unreacted sodium was removed, the tetrahydrofuran was vacuum-stripped, and the remaining liquid combined with ether and water-washed. Acidification of the aqueous phase and further ether washing resulted in the recovery of free acids. About 11% of the solvent extract had reacted. The acid product had an indicated average molecular weight of 686, a saponification value of 171, and a calculated equivalent weight of 328, indicating 2.1 carboxyl groups per molecule.

EXAMPLE II 100 gms. of extract oil No. 19 (Table I) and 675 ml. of dry tetrahydrofuran were charged to a one-liter, 3-necked flask equipped with a stirrer, thermometer, pressure-equalized drop-funnel, gas inlet with rotometer, and gas outlet. A dry nitrogen atmosphere was maintained in the flask. Approximately 100 gms. of Alundum balls (a proprietary product comprising white fused alumina containing 99% $Al_2O_3$ with traces of sodium, iron, titania and silica), 5/16" in diameter, were charged and agitation started. The solution was cooled to −20° C. and 8.3 gms. of sodium as a 20% dispersion in toluene were added. After an induction period of about 5 minutes, the solution was warmed, and at −7° C. the reaction began; in 17 minutes it was proceeding rapidly. An excess of dry carbon dioxide was added at −180° C. over a period of 78 minutes. The reaction mass was worked up as in Example I after the excess sodium was destroyed with water. About 15% of the extract oil reacted, and 22.5 gms. of acid were recovered having a saponification value of 241, indicating an equivalent weight of 233. The acid product contained 2.8% sulfur.

EXAMPLE III

The process of Example II was repeated producing complex acids having a saponification value of 323, indicated equivalent weight of 173, indicated average molecular weight (cryoscopic) of 600, and containing 3.0% sulfur. The ratio of molecular weight to equivalent weight was 3.4, indicating a mixture containing acids with more than two carboxyl groups per molecule.

EXAMPLE IV

The various recovered acids of application Serial No. 819,932, illustrated in Table II therein, are further examples of polycarboxylic acids to be used to prepare the thermosetting resins of this invention.

EXAMPLE V

The various polycarboxylic acid products described in Runs 12 through 47 of application Serial No. 79,661 are further examples of acids that may be used.

The starting material for the reaction to prepare the complex acids may be any complex polynuclear, and/or heterocyclic aromatic hydrocarbon from synthetic or natural sources. A preferred and unique source of aromatic starting material comprises petroleum fractions rich in more complex polynuclear aromatic hydrocarbons, not only because the dibasic or polybasic acid products therefrom have unique properties, but also because the techniques outlined herein are particularly adapted to processing these more complex and resistant source materials. Illustrating the preferred and novel starting materials is the class known as solvent extracts from the manufacture of mineral lubricating oils, which solvent extracts are rich in complex, polynuclear, aryl, alkaryl, condensed ring and heterocyclic nuclei forming the organic portion of the dibasic or polybasic carboxylic acids of this invention. Solvent extracts from the manufacture of bright stock and neutral lubricating oils are particular examples of such fractions rich in complex aromatic compounds obtained as by-products from the solvent refining of mineral oils.

For example, a preferred source of the above-defined complex hydrocarbons comprises the extracts obtained in solvent refining mineral oils, particularly lubricating oil fractions. These extracts, hereinafter referred to as solvent extracts, are obtained as the extract or solvent phase when lubricating oils are refined by treatment with a selective solvent having an affinity for aromatic and sulfur compounds. The complex hydrocarbons removed by this refining treatment often contain appreciable amounts of combined sulfur, nitrogen and oxygen. These complex hydrocarbons contain a predominance of polynuclear rings of aromatic structure, and of condensed configurations having hydrocarbon substituent groups attached thereto as side chains. These starting materials are of a generally viscous nature, have low viscosity indices, low resistance to oxidation, and are considered to be deleterious in lubricating oils. Heretofore, these aromatic extracts have been regarded as waste products, and because they are exceedingly complicated mixtures of complex compounds, including various sulfur-, oxygen-, and nitrogen-containing compounds, they have not been used successfully in preparing petrochemicals or as sources of hydrocarbon reactants or starting materials.

The starting materials used are adequately described as those aromatic materials separated from mineral lubricating oils and their fractions (i.e., those aromatics obtained in the manufacture and refining of neutral oils and bright stocks during treatment with a selective solvent designed to extract the predominantly aromatic materials from the paraffinic materials). Solvent extracts resulting from the treatment of mineral lubricating oils for the purpose of separating non-aromatic hydrocarbons (the raffinate and finished oil) from the aromatic hydrocarbons (the extract and waste product) may be used and are preferred as starting materials.

Since the general process of refining mineral lubricating oils in which solvent extracts are obtained is well known, it is only necessary for present purposes to describe a typical procedure for obtaining same and give some examples by way of illustration.

In a typical operation, desalted crude oil is first charged to a distillation unit where straight-run gasoline, two grades of naphtha, kerosine, and virgin distillate are taken off, leaving a reduced crude residue. The reduced crude is continuously charged to a vacuum distillation unit where three lubricating oil distillates are taken off as side streams, a light distillate is taken off as overhead, and a residuum is withdrawn from the bottom of the tower. The residuum is charged to a propane-deasphalting unit wherein propane dissolves the desirable lubricating oil constituents and leaves the asphaltic materials. A typical vacuum residuum charge to the propane-deasphalting unit may have an API gravity of 12.9°, viscosity SUS at 210° F. of 1249, flash 585° F., fire 650° F., C.R. of 13.9 weight percent, and may be black in color. The deasphalted oil may have an API gravity of 21.5° to 21.8°, viscosity SUS at 210° F. of 165–175, NPA color 6–7, flash 575° F., fire 650° F., and C.R. of 1.7–2.0. The deasphalted oil and various lubricating oil distillates from the reduced crude are subjected to solvent extraction for the separation of non-aromatic from aromatic constituents prior to use. The refined oil or "raffinate" from the extraction processes is used per se, or as blending stock, for lubricating oils, and the solvent extract, predominating in complex aromatic constituents, is distinctively useful in accordance with this invention.

For example, a crude oil from an East Texas field, with an API gravity of 33.1, was topped to remove such light fractions as gasoline, naphtha, kerosine, and a light lubricating distillate. The vacuum residue was a reduced crude, having a viscosity of 1251 SUS at 210° F., 2.2 percent sulfur, and an API gravity of 12.6. After propane-deasphalting, the oil had a viscosity of 174 SUS at 210° F., and an API gravity of 21.7. This deasphalted oil was treated with phenol to produce a raffinate from which an aviation lubricating oil could be prepared. The oil extracted by phenol treatment, after removal of phenol, is ready for use as the starting material in accordance with this invention.

Solvents other than phenol may be used to obtain the extraction product used in accordance with this invention, for example, liquid sulfur dioxide, nitrobenzene, 2,2' dichloroethyl ether, chlorophenol, trichloroethylene, cresylic acid, pyridine, furfural, or the Duo-Sol solution (a proprietary composition comprising liquid propane and cresol) may be used. When using phenol, it is possible to vary the characteristics of the extract and raffinate products considerably by adjustment of the amount of water present. A raffinate of relatively low viscosity index can be obtained by using a water solution of phenol during the extraction, and a raffinate of high viscosity index can be obtained by using anhydrous phenol. Following are the physical characteristics of typical extract products, from lubricating oil stocks derived from various crude oils and other source hydrocarbon materials, which may be used in accordance with this invention.

The solvent extracts from lubricating oils used as starting materials for this invention have the following general properties and characteristics:

Table II

| Characteristic: | Range of value |
|---|---|
| Gravity, °API | 7.3–18.3 |
| Gravity, Sp., 60/60° F. | 0.9446–1.0195 |
| Viscosity, SUS @ 100° F. | 250–25,000 (ext.) |
| Viscosity, SUS @ 130° F. | 140–19,000 |
| Viscosity, SUS @ 210° F. | 200–1500 |
| Viscosity index | −101–+39 |
| Pour point (max.) | +35–100 |
| Color, NPA | +2–5D |
| Molecular weight, average (above 300) | 320–750 |
| Boiling point (initial), °F. | 300–1000 |
| Boiling point (end), °F. | 400–1200 |
| Sulfur, percent wt. | 1.9–4.5 |
| Sulfur compounds, percent wt. | 20–50 |
| Aromatics and thio compounds | 50–90 |
| Thio compounds | 14–40 |
| Neutral aromatic hydrocarbons | 40–51 |
| Av. number of rings/means arom. mol. | 1.7–3.5 |
| H/C wt. ratio | 0.116–0.136 |
| H/C atom ratio, whole sample | 1.383–1.622 |
| H/C atom ratio, aromatic portion | 1.289–1.500 |
| Nearest empirical formula | $C_{22}H_{30}$–$C_{44}H_{66}$ |

The specific gravities of the extracts in general increase with increase in the viscosity of the raffinate at a constant viscosity index. Stated otherwise, the specific gravities of these extracts increase with decrease in viscosity index of the raffinate at a constant viscosity. For the production of 100±5 V.I. neutral oils, the viscosities of the extracts increase with increase in stated viscosities of the neutral oils (raffinates). The pour points of extracts are high and are affected by changes in the depth of extraction. The sulfur contents are also affected by the depth of extraction. The solvent extracts are characterized by containing aromatic and heterocyclic compounds in the range of 75–98%, the remainder being

Table I
SOURCES AND PHYSICAL CHARACTERISTICS OF SOLVENT EXTRACTS

| Ext. No. | Crude Source | Solvent | API Grav. | Sp. Gr. at 10° F. | Vis/100° F. | Vis/130° F. | Vis/210° F. | V.I. | Pour | °F. Flash | °F. Fire | Iodine No. (Wijs) | Percent C.R. | Percent Sulfur |
|---|---|---|---|---|---|---|---|---|---|---|---|---|---|---|
| 1 | East Tex | Phenol | 11.1 | | 23,319 | 4,750 | 282 | −40 | +55 | | | | 7.2 | 2.66 |
| 2 | do | do | 15.4 | | 15,000 | | 385 | +39 | | | | | | |
| 3 | do | do | 12.6 | | 36,410 | 4,310 | 310.1 | −1 | +80 | | | | 4.7 | 2.27 |
| 4 | do | do | 14.6 | | 19,500 | 4,305 | 313 | +27 | +90 | | | | 4.7 | 2.2 |
| 5 | do | do | 15.4 | | 32,500 | | 372 | +5 | +60 | | | | 4.13 | 2.33 |
| 6 | do | do | 13.7 | | 25,000 | 5,400 | 355 | +27 | +80 | | | | | 2.18 |
| 7 | do | do | 8.6 | | 145,000 | 19,000 | 616 | 0 | +70 | | | | | |
| 8 | do | do | 10.5 | | 12,676 | 2.514 | 172.1 | +101 | +60 | | | | | 2.88 |
| 9 | Santa Fe Springs | do | 10.2 | 0.9984 | | | 371 | | +65 | 520 | 600 | 69.4 | | |
| 10 | Texas | Furfural | 13.0 | 0.9791 | | | 1,500 | | +85 | 470 | 515 | 57.1 | | |
| 11 | Penn | Chlorex | 12.2 | 0.9843 | | | 1,365 | | +85 | 560 | 630 | 71.4 | | |
| 12 | do | Nitrobenzene | 10.0 | 1.000 | | | 1,500 | | +75 | 555 | 640 | 60 | | |
| 13 | Mid-Cont | Propane cresol | 14.4 | 0.9699 | | | 1,500 | | +100 | 540 | 605 | 63.7 | | |
| 14 | do | Phenol | 13.6 | | | | 41.7 | −82 | +20 | | | | | |
| 15 | do | Chlorex | 13.6 | | | | 200 | −61 | +75 | | | | | |
| 16 | do | Phenol | 8.9 | | | | 569 | | +75 | | | | | |
| 17 | do | Furfural | 14.9 | | | | 50.2 | 25 | +20 | | | | | |
| 18 | East Tex | Phenol | 13.5 | .976 | 25,000 | | 341 | 17 | +65 | 530 | 610 | | 5.76 | 2.36 |
| 19 | do | do | 11.1 | | | | 61.5 | −56 | +40 | 435 | 475 | | 0.42 | 2.7 |
| 20 | do | do | 13.7 | | | | 360 | +25 | +65 | 550 | 630 | | 5.5 | 2.3 |
| 21 | do | do | 7.8 | | | | 71.1 | −128 | +35 | 420 | 495 | | 0.86 | 3.2 |
| 22 | do | do | 7.3 | | | | 796 | −76 | +65 | 520 | 610 | | 7.7 | 3.0 |
| 23 | do | do | | | | | | −55 | +70 | | | | 1.1 | 2.75 |
| 41 | do | do | 17.6 | | 154 | 80 | 41 | 11 | −30 | 400 | 435 | | 0.1 | 2.0 |
| 42 | do | do | 13.7 | | 26,000 | 5,615 | 360 | +25 | +65 | 550 | 630 | 37.5 | 5.5 | 2.3 |
| 43 | do | do | 11.1 | | 1,054 | 331 | 61.5 | −56 | +40 | 435 | 475 | 40.0 | 0.4 | 2.7 |
| 44 | do | do | 7.7 | | 2,007 | 611 | 71.1 | −128 | +35 | 420 | 495 | 38.6 | 0.86 | 3.2 |
| 45 | do | do | 7.3 | 1.019 | 230,000 | 20,800 | 796 | −76 | +65 | 520 | 610 | | 7.7 | 3.0 |

Extract No. 41 was obtained in the production of 85 vis neutral, has an average molecular weight of 300, and contained 76.8% aromatics (by the silica gel procedure).
Extract No. 42 was obtained in the production of 150 vis Bright Stock, has an average molecular weight of 590, and contained 86% aromatics, 14% saturates, 86.2% carbon, 11.4% hydrogen, and averaged 3.3 aromatic rings per aromatic molecule.
Extract No. 43 was obtained in the production of 170 vis neutral, has an average molecular weight of 340, contained 84.1% aromatics, 15.9% saturates, 86.4% carbon, 10.7% hydrogen and averaged 2.7 aromatic rings per aromatic molecule.
Extract No. 44 was obtained in the production of 200 vis neutral, has an average molecular weight of 340, contained 87% aromatics, and 13% saturates.
Extract No. 45 was obtained in the production of 160 vis Bright Stock, contained 92% aromatics and 8% saturates.

principally saturates, or material behaving as saturates, together with a minor proportion of up to about 7% of organic acids. The organic acids present are not susceptible to extraction by the use of aqueous strong caustic because of the solubility of the alkali metal salts of the acids in the oil. Little or no asphaltic material is present in solvent extracts and they contain essentially no materials volatile at room temperature.

The complexity of the types of compounds present, as based on these analyses, is illustrated by the following table:

Table III
ESTIMATED CHEMICAL COMPOSITION OF SOLVENT EXTRACTS NOS. 19, 21, 43, AND 44 OF TABLE I

| Type of compound: | Approx. percent in the Extract |
|---|---|
| Saturated hydrocarbons | 12.5 |
| Mononuclear aromatics: | |
|    Substituted benzenes | 25.0 |
| Dinuclear aromatics: | |
|    Substituted naphthalenes | 30.0 |
| Trinuclear aromatics: | |
|    Substituted phenanthrenes | 10.0 |
|    Substituted anthracenes | 5.0 |
| Tetranuclear aromatics: | |
|    Substituted chrysenes | 00.5 |
|    Substituted benzphenanthrenes | 0.2 |
|    Substituted pyrenes | 0.2 |
| Pentanuclear aromatics: | |
|    Perylene | 0.01 |
| Sulfur components *, oxygen compounds etc | 16.5 |

\* Mainly heterocyclic compounds. The average mol. wt. of Extracts 19 and 21 is 340, and that of Extract 20 is 590.

Any portion of the reactive aromatic constituents in solvent extracts may be isolated therefrom, or from other sources, to be used as starting materials for the reaction in accordance with this invention. For example, solvent extracts may be distilled and selected fractions thereof used as the starting materials. The content of reactive, complex, polynuclear, aromatic compounds and heterocyclics present in solvent extracts, as illustrating the preferred source material, may vary depending on the type of solvent, the extraction process applied, and the mineral oil treated, although the general types of compounds present in the extract are not so varied. Extracts containing from about 30% to 90% of polynuclear aromatics and heterocyclics of aromatic nature represent a preferred type of starting material.

In addition to the general physical and chemical properties of the solvent extracts given in Table II, these starting materials may be further characterized by the fact that their average molecular weight is about 320 to 600, the boiling point (initial) is between 300 to 1000° F., the end boiling point is between 400 to 1200° F., and they may exhibit pour points as high as 100° F. Chemically, the extracts may contain 1.9 to 4.5% wt. of sulfur, exhibit a H/C wt. ratio of 0.116 to 0.136, a H/C atom ratio of 1.383 to 1.622, a H/C atom ratio, based only on the aromatic portion, of 1.289 to 1.500, and the nearest empirical formula is $C_{22}H_{30}$ to $C_{44}H_{66}$. The extracts may contain from about 15% to 50% by weight of sulfur compounds, and 30% to 90% by weight of aromatic and thio compounds. Many of these characteristics, particularly the chemical characteristics, carry over into the polymerized polynuclear polyesters of this invention.

Without limiting the invention, the characteristics of the products of this invention as influenced by the complex acids are further disclosed as thus far evaluated. The di- and polycarboxylic acids used are mixtures of acids of the dihydronaphthalene, dihydrophenanthrene, and dihydroanthracene types averaging in molecular weight from about 375 to 450 having several alkyl groups in each aromatic nucleus wherein the sum of the carbon atoms in the alkyl substituents varies between 15 to 22.

Despite the size of the acid molecules the linkages through or between the carboxyl groups are about the same as those of phthalic and terephthalic acids. A portion of the aromatic rings or condensed aromatic rings is probably further condensed with naphthenic rings to form configurations similar to the steroid ring system. Extract dibasic acids from solvent extracts obtained in the production of bright stocks probably contain more highly condensed aromatic structures. Most of the sulfur (1.9 to 3.2% or 4.5% total sulfur being present) is in the form of heterocyclic rings with carbon associated with both the aromatic type and naphthenic type structures present. Only trace amounts of the sulfur are present as high-molecular-weight aliphatic sulfides. The nitrogen content of distilled solvent extracts is 0.01 to 0.04%. Analysis for the types of carbon linkages as percent $C_a$ (carbon atoms in aromatic configuration), percent $C_n$ (carbon atoms in naphthenic configuration) and percent $C_p$ (carbon atoms in paraffinic configuration) gives results ranging from about 30–40% $C_a$, 20–35% $C_p$ and 31–47% $C_p$ using the method of Kurty, King, Stout, Partikian and Skrabek (Anal. Chem. 28, 1928 (1956)). The polybasic acids used in preparing the polymerized polyester resins have acid numbers (1948 Method) of from 200–300, M.P. 80–90° C., bromine number 16–24, sulfur 1.7–2.3%, are deep red in color, transparent in thin sheets and contain 2–6% unsaponifiables. They are soluble in ethyl ether, acetone, methyl ethyl ketone, tetrahydrofuran, benzene, toluene, and xylene.

The alcohols used to prepare the esters of this invention are mono-, or dihydric, olefinic or acetylenic alcohols of the formulae:

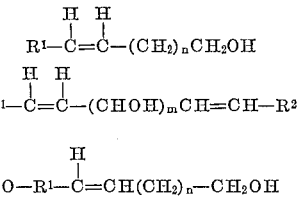

and

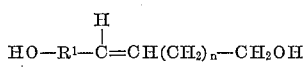

wherein $R^1$ and $R^2$ are hydrogen or a hydrocarbon radical having from 1 to 20 carbon atoms which may be in the form of alkyl, aryl, alkaryl, aralkyl, cycloalkaryl, hydroxy alkyl, hydroxy-cycloalkane groups, $n$ is zero to 10, $m$ has a value of 1 or 2 and the olefinic bonds may be acetylenic. Examples include allyl alcohol, crotyl alcohol, isocrotyl alcohol, methyl vinyl carbinol, 2-pentene-1, 3-pentene-1-ol, 4-pentene-1-ol, 3-pentene-2-ol, 4-pentene-2-ol, 2-methyl-2-butene-1-ol, 2-methyl-3-butene-1-ol, 2-hexene-1-ol, 2-heptene-1-ol, 2-octene-1-ol, 3-octene-1-ol, 4-octene-1-ol, 2-nonene-1-ol, 3-nonene-1-ol, 4-nonene-1-ol, 5-decene-1-ol, 6-decene-1-ol, 7-decene-1-ol, 7-dodecene-1-ol, 8-undecene-1-ol, 9-tetradecene-1-ol, 10-heptadecene-1-ol, 9-octadecene-1-ol, 9-octacene-2-ol, 2-eicosene-1-ol, 3-eicosene-1-ol, 3-eicosene-2-ol, propargyl alcohol, 2-butyne-1-ol, 3-butyne-1-ol, 3-butyne-2-ol, 2-pentyne-1-ol, 3-pentyne-1-ol, 4-pentyne-1-ol, 3-pentyne-2-ol, 4-pentyne-2-ol, 2-butene-1,4-diol, 2-butyne-1,4-diol, 2-pentyne-1-ol, 1-pentyne-3-ol, 1-pentyne-4-ol, dimethylethenylcarbinol, 2-hexyne-1-ol, 3-hexyne-1-ol, n-propylethynyl carbinol, 2-methyl-4-pentyne - 2 - ol, methylethylethynylcarbinol, 4-methyl-2-pentyne-1,4-diol, 2-heptyne-1-ol, 3-heptyne-1-ol, 5-methyl-3-hexyne-2 - ol, methyl-n-propylethynylcarbinol, 4,4-dimethyl-2-pentyn-1-ol, diethylethynylcarbinol, methylethylpropynylcarbinol, 2,5-heptadiyne-4-ol, 2-octyne-1-ol, 3-octyne-1-ol, 3-octyne-2-ol, 3,5-octadiene-2,7-diol, methyl-t-butylethynylcarbinol, 2,5- dimethyl-3-hexyn-2,5-diol, 3-nonyne-2-ol, methyl-n-amyl ethynylcarbinol, and diisopropylethynylcarbinol to includes the series

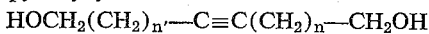

and

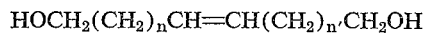

where in each instance $n=0, 1, 2, 3$ etc. up to 10 or more and $n'=0, 1, 2, 3$ etc. up to 10 or more.

Other aliphatic olefinic alcohols include divinylcarbinol, 2,4-hexadiene-1-ol, 1,5-hexadiene-3-ol, 1,3-hexadiene-5-ol, 1,5-hexdiene-3,4-diol, 2-methyl-3-pentene-2-ol, 4-methyl-3-pentene-2-ol, 2-methyl-4-pentene-2-ol, 4-methyl-4-pentene-2-ol, isopropinylvinylcarbinol, 2,2-dimethyl-3-butene-1-ol, 4-heptene-1, 6-heptene-1-ol, 3-heptene-2-ol, 4-heptene-3-ol, 2-heptene-4-ol, 1,5-heptadiene-4-ol, 2-methyl-4-hexene-3-ol, 3-methyl-5-hexene-3-ol, 5-methyl-1-hexene-5-ol, vinylisobutenylcarbinol, 2,4-dimethyl-3-pentene-2-ol, 2-isopropyl-3-hydroxy-1-butene, cis-2-octene-1-ol, trans-2-octene-1-ol, 1-octene-4-ol, 2,4,6-octatriene-1-ol, 2-methyl-6-heptene-2-ol, 6-methyl-2-heptene-6-ol, 6-methyl-3-heptene-6-ol, cis-2,5-dimethyl-3-hexene-2,5-diol, 8-nonene-1-ol, 4,6-dimethyl-1-heptene-4-ol, citronellol (from rose oil), rhodinol, phytol, dipropenyl glycol, 4,6-dimethyl-1,5-heptadiene-4-ol, ω-undecylenyl alcohol, oleyl alcohol, and linoleyl alcohol.

The alicyclic olefinic alcohols such as 2-cyclopentenol, 2-cyclohexenol, 1-methyl-2-cyclohexenol, 2-(1-cyclopentenyl)-ethanol, 1-vinyl-1-cyclopentanol, 1-methyl-2-cyclopentenol-1-carbinol, methyl-1-cyclopentenylcarbinol, β-(1-cyclohexenyl)-ethanol, 1-allylcyclopentanol, ethyl-1-cyclopentenyl-carbinol, 4-n-propyl-2-cyclohexenol (cryptol), 4-(2'-cyclopentenyl)-1-butanol, 1-methallylcyclopentanol, and trans-2-cyclohexenylcyclohexanol can be used.

The aromatic olefinic alcohols and phenols such as O-vinylphenol, cinnamyl alcohol, phenylvinyl carbinol, O-allylphenol, O-propenylphenol, phenylpropenyl carbinol, methyl-α-styrylcarbinol, methyl-β-styryl carbinol, phenylisobutylenecarbinol, 1-(α-naphthyl)-3-butene-1-ol, O-cinnamylphenol, 2-hydroxymethyl stilbene can be used.

The alicyclic and aromatic acetylenic alcohols such as 1-ethynylcyclopentanol, 1-ethynylcyclohexanol, 1-ethynylcycloheptanol, 4-cyclopentyl-2-butyne-1-ol, phenylethynylcarbinol, 1-phenyl-1-butyne-3-ol, 1-phenyl-1-butyne-4-ol, and diphenylethynylcarbinol can also be used.

As seen from the foregoing examples, $R^1$ and $R^2$ in Formulae I, II, III and IV may be hydrogen, an alkyl, aryl, alkaryl, aralkyl, cycloparaffinic radical or a hydroxyalkyl, hydroxylaryl, hydroxyalkaryl, hydroxyaralkyl or hydroxycycloparaffinic radical, containing up to 20 carbon atoms and —CH=CH— may be —C≡C— (acetylenic). Examples of alkyl groups include methyl, ethyl, propyl, isopropyl, butyl, isobutyl, t-butyl, amyl, isoamyl, hexyl, isohexyl, heptyl, octyl, nonyl, decyl, undecyl, dodecyl, tridecyl, tetradecyl, pentadecyl, hexadecyl, heptadecyl, octadecyl, nonadecyl and eicosyl groups. The cycloparaffinic groups may be cyclopropyl, cyclobutyl, cyclopentyl, cyclohexyl, methyl cyclopentyl, and the like. Aryl and alkaryl groups include phenyl, naphthyl, anthryl, tolyl, xylyl and the like groups. Any of the foregoing may contain hydroxy groups to form the hydroxyl-containing series.

The polymerized resin products of this invention are softer, more pliable etc. than prior art resins prepared from saturated monohydric or dihydric alcohols and unsaturated dicarboxylic acids. This is apparently due to the complex polynuclear group present in the polycarboxylic acids derived from solvent extracts. As seen from this description two types of esters, namely, those prepared from monohydric olefinic alcohols and those prepared from dihydric olefinic alcohols, are used to prepare the polymerized resin products of this invention.

When "monomeric" diesters are formed and polymerized, an alcohol/acid molar ratio of about 2/1 is used and with dihydric alcohols the alcohol/acid molar ratio may be 1/1 to or as high as 5/1, and the molecular weight of the polyester intermediate and consequently that of the resin can be controlled. I have found that with an alcohol/acid molar ratio of greater than 1/1, a relatively low molecular weight intermediate polyester results. The molecular weights of the polyesters are inversely proportional to the alcohol/acid mole ratio. Also, the use of higher esterification temperatures results in intermediate polyesters of relatively low molecular weights and low esterification temperatures in the order of 100 to 200° C. produces polyesters having high molecular weights, i.e., the molecular weight of the polyester is inversely proportional to the esterification temperature. Other ways of controlling the molecular weight and properties of the polymerized resins of this invention are choice and concentration of the polymerization catalyst and the use of "chain-breakers" such as hydroquinone.

The polyester intermediates are prepared by conventional esterification methods, with or without a catalyst. Any of the known esterification catalysts may be used to speed up the reaction, such as sulfuric acid, other mineral acids, boron trifluoride or other Lewis acids. The preferred method of ester synthesis involves refluxing about 1 mole of the complex polycarboxylic acids with about 2 to 2.5 moles of the mono- or dihydric olefinic alcohol. A diluent such as an inert solvent may be used when convenient for lowering the reflux temperature and removing water as an azeotropic mixture. The ester product is then washed in the usual manner to remove any residual acid and subjected to distillation at reduced pressure (about 1 mm.) to remove excess alcohol and any moisture that may be present. The reaction can be carried out at temperatures ranging from 100° to 200° C. When an excess of olefinic alcohol is used, that is alcohol/acid molar ratios in excess of 1/1, a substantially neutral ester and final resin is obtained which tends to be soluble in water and organic solvents, but is alkali resistant. When an alcohol/acid molar ratio of less than 1/1, an acidic resin is obtained which is subject to deterioration by contact with alkali.

The polymerization reaction is also carried out by conventional methods using a small amount, less than 2% of an initiator such as a Lewis acid, a peroxide or a trace amount of an alkali metal. The reaction proceeds of its own accord, beginning at room temperature and gradually becoming exothermic. Means may be provided to control the exothermic reaction temperature so as not to exceed 200° C. One procedure is to dissolve the esters in a suitable solvent and add methyl ethyl ketone peroxide and subsequently cobalt naphthenate or dimethyl aniline slowly with agitation. The esters may be incorporated in paints or other coating materials and caused to polymerize into protective coatings by the addition of metallic driers such as those of the cobalt and lead naphthenate series. The resins are useful as laminating agents, shell-molding compounds and protective coatings.

Other examples of feed materials that comprise a source of related polynuclear aromatic compounds comprising the nuclei of the acids are FCC recycle stock and combined reformate polymers described in U.S. Patent No. 3,153,087. In addition to the polymerizing catalyst disclosed herein, other suitable catalysts are acetyl peroxide, cumene hydroperoxide, azo-bis-isobutyronitrile, as well as numerous other peroxy-type catalysts known in the art.

The embodiments of the invention in which an exclusive property or privilege is claimed are defined as follows:

1. A polymerized, cross-linked resin prepared by the reaction under esterification conditions of
   (1) a carboxylic acid prepared from solvent extracts obtained in the solvent refining of mineral lubricating oils using a solvent selective for aromatic compounds, by reaction of said solvent extracts with an alkali metal to form the alkali metal adduct, carbonation of said adduct to form the corresponding alkali metal salt of a carboxylic acid and acidification of said salt to form the free acid characterized by having an average molecular weight of about 375 to 450, contain about 1.9 to about 4.5 weight percent of combined sulfur and have an average of about 1.7 to 3.5 aromatic rings per mean aromatic molecule and (2) an alcohol of the group consisting of monohydric olefinic alcohols having 3 to 33 carbon atoms per molecule, monohydric diolefinic alcohols having 5 to 45 carbon atoms per molecule, dihydric diolefinic alcohols having 6 to 46 carbon atoms per molecule, dihydric olefinic alcohols of 4 to 33 carbon atoms per molecule and the corresponding acetylenic alcohols of said group using about 1 mole of said carboxylic acid to about 2 to 2½ moles of said alcohol at a temperature of about 100° to 200° C. to form the unsaturated ester and polymerizing said ester in the presence of a peroxide initiator.

2. A polymerized, cross-linked resin in accordance with claim 1 in which said peroxide initiator is methyl ethyl ketone peroxide.

References Cited by the Examiner
UNITED STATES PATENTS

| | | | |
|---|---|---|---|
| 2,221,662 | 11/1940 | Rothrock | 260—78.4 |
| 2,482,606 | 9/1949 | Adelson | 260—468 |
| 2,723,259 | 11/1955 | Kurtz | 260—468 |
| 2,911,433 | 11/1959 | Jolly | 260—468 |
| 2,965,587 | 12/1960 | Rickert | 260—75 |
| 2,970,164 | 1/1961 | Jezl | 260—75 |
| 3,056,773 | 10/1962 | Joo et al. | 260—128 |
| 3,097,231 | 7/1963 | Mills et al. | 260—468 |
| 3,128,302 | 4/1964 | Martinek | 260—475 |
| 3,129,192 | 4/1964 | Kramer et al. | 260—75 |

OTHER REFERENCES

Conant et al.: J.A.C.S., vol. 50 (1928), pp. 542–550.

Chatfield: Varnish Constituents, 3rd Edition, Leonard Hill Limited, London, 1953, 868 pages; pages 266–271 relied upon.

LEON J. BERCOVITZ, *Primary Examiner.*

H.N. BURSTEIN, *Examiner.*